United States Patent [19]

Marlowe

[11] 4,281,947
[45] Aug. 4, 1981

[54] SPOT FACE CUTTER

[76] Inventor: J. Taylor Marlowe, Rte. 3, Box 303, Ringgold, Ga. 30736

[21] Appl. No.: 108,687

[22] Filed: Dec. 31, 1979

[51] Int. Cl.³ .................. B23B 35/00; B23B 39/00; B23B 41/00
[52] U.S. Cl. .................. 408/1 R; 408/82; 408/87; 408/93
[58] Field of Search .......... 408/1 R, 82, 87, 88, 408/93, 97

[56] References Cited

U.S. PATENT DOCUMENTS

| | | | |
|---|---|---|---|
| 1,435,502 | 11/1922 | Sager | 408/93 |
| 2,347,403 | 4/1944 | Denzler | 408/87 |
| 2,415,569 | 2/1947 | Smith et al. | 408/99 |
| 2,548,113 | 4/1951 | Kruse | 408/99 |
| 3,381,579 | 5/1968 | Vindez | 408/93 |
| 3,545,311 | 12/1970 | Messer, Jr. | 408/93 |
| 4,017,201 | 4/1977 | Adams et al. | 408/82 |
| 4,106,880 | 8/1978 | Anders | 408/1 |

Primary Examiner—Harrison L. Hinson
Attorney, Agent, or Firm—Jones, Thomas & Askew

[57] ABSTRACT

A spot facing tool is mounted on a work table with an arbor located beneath the work table and movable upwardly through an opening in the work table. A cutter holder is mounted on the surface of the work table with a cutter receptacle positioned in alignment with the arbor. A cutter is releasably retained in the receptacle. The arbor is movable upwardly through the opening of a work piece and into the cutter, and connected to the cutter. The cutter and arbor are moved downwardly until the cutter engages the work piece and rotation of the cutter and arbor causes spot facing of the work piece about its opening.

6 Claims, 5 Drawing Figures

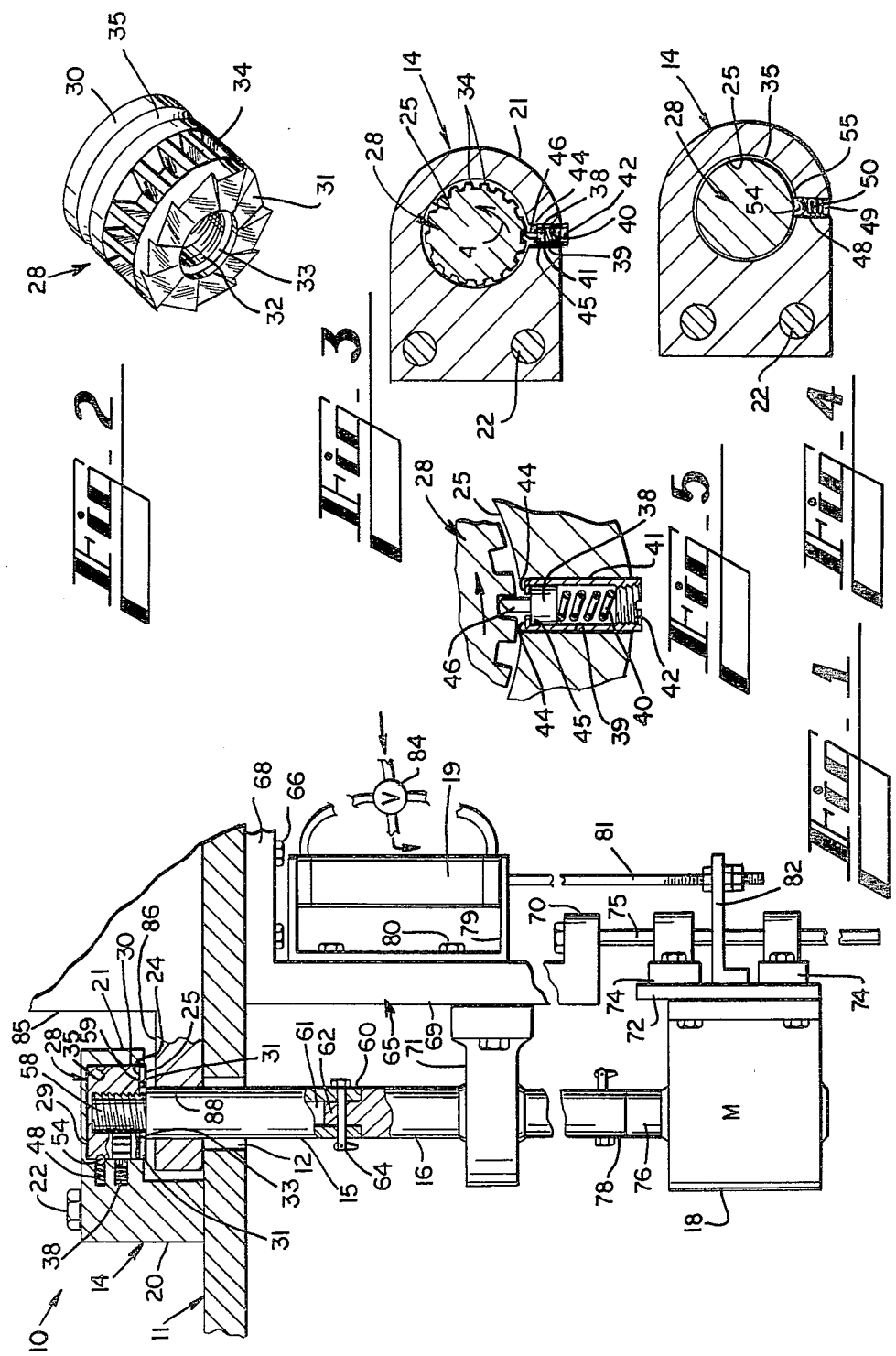

SPOT FACE CUTTER

TECHNICAL FIELD

This invention relates to a method and apparatus for cutting a work piece about a throughbore of the work piece by use of a rotating and axially movable tool, with the tool being coaxial with the bore in the work piece.

BACKGROUND OF THE INVENTION

Various machine elements and other products are manufactured in casting processes wherein the support feet, support flanges and other components are formed with openings therethrough so that the cast product can be mounted to another object by extending screws or bolts through the openings of the support feet or flanges and into a supporting surface. The surfaces of the flanges, support feet, etc. of the cast machine element or other cast product usually are tapered so that the product can be extracted from the mold after the casting procedure. In order that surface of a product about an opening be suitably formed for receiving a bolt or other connecter element through the opening so that the bolt, its washer, etc., can sit flat against the surface of the flange, etc., it is necessary to spot face the surface of the flange about the opening so that the face of the flange about the opening is formed at a right angle with respect to the axis of the opening and becomes level to properly receive the bolt head.

Various spot facing tools have been developed in the past which include a stub shaft or arbor that is inserted in the opening of the work piece, and a cutter that is mounted on the end of the arbor. The cutter and arbor are rotated and the arbor is moved through the opening in the work piece until the cutter engages the surface of the work piece, whereupon the cutter treats or "faces" the surface of the work piece about its opening. With this arrangement the arbor is maintained in coaxial alignment with the opening in the work piece and the cutter is therefore required to form a facing surface about the opening in the work piece that is formed at a right angle with respect to the longitudinal axis of the opening through the work piece.

The prior art spot facing tools are somewhat cumbersome in that the arbor usually is connected in driven relationship to a motor. While this arrangement is usable for spot facing work pieces where there are no other elements or protrusions of the work piece about the area that is to be spot faced, many work pieces include components or protrusions which leave very little space for the introduction of the cutter, arbor and its driving motor and other housing and support elements. Additionally, some of the prior art spot facing tools include an arbor with a cutter device pivotally mounted thereon whereby the arbor and its cutter both can be inserted through the opening in the work piece, and rotation of the arbor causes the cutter to swing out under centrifugal force away from alignment with the arbor, and when the arbor is moved back through the opening in the work piece the cutter is moved into contact with the surface of the work piece about the opening therein. While this is a workable arrangement, the cutter and arbor are not durable, and tend to wear rapidly.

SUMMARY OF THE INVENTION

Briefly described, the present invention comprises a spot facing tool for connection to a work table wherein the arbor is mounted beneath the opening in the work table and reciprocates upwardly through the opening in the work table. A cutter holder is mounted on the surface of the work table and defines a cutter receptacle over the opening in the work table and in alignment with the arbor. A cutter is normally releasebly maintained in the cutter receptacle. When a work piece is placed with its opening in alignment with the arbor, the arbor is moved upwardly through the opening in the work table and then through the opening in the work piece until it engages the cutter. The cutter and arbor are releasebly connected together, and the arbor and cutter are then moved downwardly and rotated until the cutter engages the work piece, whereupon the work piece is treated or "faced" about its opening. The arbor and cutter are then moved upwardly until the cutter is received in its receptacle, whereupon the arbor and cutter are detached from each other and the arbor is withdrawn downwardly out of the opening in the work piece. The work piece is then free to be moved away from the spot facing tool.

Thus, it is an object of this invention to provide a spot facing tool that is mounted on a work table and which includes a cutter positioned above the work table and an arbor positioned below the work table with the arbor being movable through an opening in the work table to releasebly engage the cutter and for drawing the cutter downwardly into engagement with a work piece.

Another object of this invention is to provide a spot facing tool which includes a cutter and an arbor movable from predetermined positions from above and from below a work table into connected relationship with respect to each other, for spot facing a work piece on the work table.

Another object of this invention is to provide a spot facing tool and work table combination which function to accurately and expediently spot face a work piece.

Another object of this invention is to provide a method and apparatus for expediently and accurately spot facing a work piece with a minimum of operator skill being required.

Other objects, features and advantages of the present invention will become apparent upon reading the following specification when taken in conjunction with the accompanying drawing.

BRIEF DESCRIPTION OF THE DRAWING

FIG. 1 is a side cross sectional view of the spot facing tool and its work table, with portions removed for clarity.

FIG. 2 is a perspective illustration of the cutter.

FIG. 3 is a top cross sectional illustration of the cutter and cutter housing, taken along lines 3—3 of FIG. 1.

FIG. 4 is a top cross sectional illustration of the cutter and cutter housing, taken along lines 4—4 of FIG. 1.

FIG. 5 is a detail cross sectional illustration of the pawl assembly.

DETAILED DESCRIPTION

Referring now in more detail to the drawing, wherein like numerals indicate like parts throughout the several views, the spot facing tool 10 is mounted on work table 11. Work table 11 defines opening 12 therethrough. Spot facing tool 10 comprises cutter holder 14, arbor 15, connecting rod 16, motor 18 and fluid cylinder 19. Cutter holder 14 includes vertically oriented support 20 and horizontally oriented housing 21. Housing 21 is located over opening 12 in work table 11, and the vertically oriented support 20 is rigidly attached to the work table by means of threaded screws 22 or other conventional attachment means. A space 24 is defined between the upper surface of work table 11 and the horizontally oriented housing 21 of the cutter holder 14. Horizontally oriented housing 21 defines receptacle 25 which faces in a downward direction and is located over opening 12 in work table 11.

Cutter 28 normally is located in receptacle 25. Cutter 28 includes a flat upper surface 29, and annular side surface 30 and a plurality of radially oriented cutting teeth 31 on its bottom surface. Internally threaded bore 32 extends centrally upwardly into cutter 28, with its threads being spiral threads. A plurality of ratchet teeth 34 are in an annular arrangement about annular side surface 30 of cutter 28, and an annular groove 35 is also formed in the annular side surface of cutter 28 above ratchet teeth 34. An annular recess 33 is formed on the bottom surface of cutter 28, between bore 32 and teeth 31.

As illustrated in FIG. 5, a pawl 38 is located in bore 39 of horizontally oriented housing 21 of cutter holder 14. Coil compression spring 40 is located behind pawl 38. Sleeve 41 surrounds pawl 38 and its spring 40, and cap nut 42 is threaded into the end of sleeve 41 to maintain the spring in the sleeve. Sleeve 41 is reduced in its diameter at its other end 44, and the shoulder 45 of pawl 38 engages the sleeve while the pawl protrusion 46 extends beyond sleeve 41 and bore 39 toward engagement with ratchet teeth 34. The teeth 34 and pawl 38 are arranged so as to limit the direction of rotation of cutter 28 in the direction as indicated by arrow 46.

Spring urged ball assembly 48 is mounted in bore 49 of cutter holder 14 and includes spring 50, sleeve 51, cap nut 52 and ball 54. The reduced diameter portion 55 of sleeve 51 keeps ball 54 from being urged beyond the sleeve, but ball 54 is projected into receptacle 25, and into the annular groove 35 of cutter 28. Thus, spring urged ball assembly 48 tends to releasably maintain cutter 28 in its receptacle 25, as illustrated in FIG. 1.

As illustrated in FIG. 1, arbor 15 is rectilinear and includes at its upper end an externally threaded stub 58, the threads of which are helical and are sized and shaped to mesh with the internal threads 32 of cutter 28. Annular shoulder 59 extends about stub 58, and shoulder 59 is sized and shaped to be received in the annular recess 33 of cutter 28. The lower end of arbor 15 is connected to connecting rod 16 by means of male-female connection 60 wherein a rectangular recess 61 of arbor 15 is mated with a rectangular protrusion of connecting rod 16, and a connecting pin 64 is inserted through aligned openings (not shown) of the arbor and connecting rod.

Support plate 65 is mounted to the bottom surface of work table 11 by means of screws 66 or other conventional fastening means and includes upper horizontal leg 68, vertical leg 69 and lower horizontal leg 70. One or more bearings 71 are mounted to vertical leg 69 of support plate 65 and connecting rod 16 is slidably and rotatably received therethrough. Thus, connecting rod 16 is rotatable in bearings 71 and is movable axially along its length within bearings 71.

Motor 18 is mounted on movable platform 72, and bearings 74 are mounted to the opposite surface of platform 72. Slide rods 75 are rigidly mounted in lower horizontal leg 70 of support plate 65 and extend downwardly therefrom through bearings 74 of movable platform 72. Thus, motor 18 is movable vertically along the length of slide rod 75. Drive shaft 76 of motor 18 is connected to the lower end of connecting rod 16 with a male-female connection 78 which is similar to the male-female connection 60.

Fluid cylinder 19 is mounted at its ends on U-shaped bracket 79 and bracket 79 is connected by screws or other conventional connecting means 80 to support plate 65. The cylinder rod 81 protrudes downwardly from cylinder 19, and connecting bracket 82 is connected to the lower end of cylinder rod 81 and to movable platform 72. Cylinder 19 is a double acting fluid actuated cylinder, and valve 84 connects opposite ends of the cylinder to an exhaust duct or to a source of fluid under pressure. Thus, with valve 84 in one position, one end of cylinder 19 will be pressurized and its other end will be in communication with the atmosphere, whereupon the cylinder rod 81 will be urged in one direction, and when valve 84 is shifted to its other position, the reverse condition will occur. In this manner, motor 18 and arbor 15 can be reciprocated by changing the position of valve 84, to move arbor 15 upwardly and downwardly through the opening 12 in work table 11. Motor 18 is a reversible motor and is capable of rotating arbor 15 in both directions.

OPERATION

When a work piece 85 having a flange, foot, or other projection 86 that defines an opening 88 therethrough is placed on work table 11, the projection 86 is moved laterally beneath the horizontally oriented housing 21 of cutter holder 14 until its opening 88 is in alignment with arbor 15. Motor 18 is energized to rotate arbor 15 in its "right hand" direction of rotation as indicated by arrow 46 (FIG. 3), and valve 84 is shifted so as to pressurize the lower portion of cylinder 19. This causes motor 18 and arbor 15 to be moved upwardly, with the connecting rod 16 sliding through its bearings 71. The upper end of the arbor moves through the opening 12 in the work table and through the opening 88 and the work piece 85, and the external threads of the smaller diameter stub engage the threads of the bore 32 of cutter 28. In this manner the arbor 15 is threaded into cutter 28 until the annular shoulder 59 of the arbor engages the annular recess 33 of the cutter. As the arbor is threaded into the cutter the frictional contact of the cutter in its recess 25 together with the frictional contact of the spring urged ball assembly 48 and the pawl 38 against the surface of the cutter tend to keep the cutter from rotating with the arbor. After the arbor has been threaded into the cutter, the cutter begins rotating in unison with the arbor 15.

After the arbor has been connected to the cutter, the operator adjusts valve 84 so as to move arbor 15 and cutter 28 downwardly, whereby the cutter begins its downward rotating movement out of its receptacle 25 and its cutting teeth 31 engage the portion of the work piece that surrounds the opening 88 of the work piece. The arbor 15 is of only slightly smaller diameter than the diameter 88 of the work piece. Therefore, arbor 15 maintains cutter 28 in coaxial alignment with the opening 88 of the work piece, and the cutter functions to cut or finish that surface of the work piece that surrounds itds opening 88.

When the finishing of the work piece has been accomplished, the operator manipulates valve 84 so that pressure is applied to the lower end of cylinder 19, thus raising cutter 28 so that it is received in its receptacle 25.

The spring urged ball assembly 48 retains the cutter in its receptacle. The operator then causes motor 18 to rotate its drive shaft 76 in the reverse direction, whereupon arbor 15 moves in a direction opposite of that indicated by arrow 46 (FIG. 3). The pawl 38 prevents cutter 28 from moving in this opposite direction, whereupon the threads of the arbor are unthreaded from the threads of the bore 32 of cutter 28. The operator manipulates valve 84 so that motor 18 and arbor 15 are permitted to move downwardly, so that the arbor moves down out of the opening 88 of the work piece to a level beneath the working surface of work table 11. Cutter 28 is retained in its receptacle. The operator is then free to remove the work piece 85 from the work table.

When it is desired to spot finish a work piece that has a different size opening 88 therein, the operator can change the pawl and cutter by removing the connection pin 64 of pawl 15 and removing the pawl 15 from connecting rod 16 and placing a new pawl thereon and reinserting the connection pin. Also, the screws 22 or other connection means can be removed from the cutter holder 14 and another cutter holder and cutter can be mounted on the work table 11.

While this invention has been described in detail with particular reference to a referred embodiment thereof, it will be understood that variations and modifications can be effected within the spirit and scope of the invention as described hereinbefore and as defined in the appended claims.

I claim:
1. A spot facing tool for connection to a work table defining an opening therethrough, said tool including a reversible motor with a drive shaft, an arbor connected to said motor drive shaft for rotation about its longitudinal axis, support means movably supporting said arbor beneath the table in alignment with the opening of the table, means for moving said arbor vertically through the opening of the work table, a cutter holder mounted on the upper surface of the work table and including a cutter receptacle positioned in spaced relationship over the upper surface of the work table and over the opening of the work table and in alignment with said arbor, a cutter sized and shaped to be received in said cutter receptacle and normally rotatably received in said cutter receptacle and movable between a position where it is received in said receptacle and to a lower position closer to the upper surface of the work table, said cutter and said cutter holder including means for releaseably maintaining said cutter in said receptacle, said arbor and said cutter including connector means for releasably connecting together said arbor and said cutter, whereby a work piece defining a hole therein is moved between the cutter receptacle and the work table with the hole in the work piece aligned with the arbor, the arbor is raised to extend through the hole in the work piece and into the cutter in the receptacle, the cutter and arbor are connected together, the cutter and arbor are lowered and rotated so that the cutter engages and treats the work piece about the hole in the work piece.

2. In combination, a work table defining an opening therethrough and a spot facing tool mounted on said work table, said spot facing tool comprising an arbor, means for rotatably supporting said arbor below said work table and in alignment with said opening and for reciprocating said arbor through said opening, a cutter holder mounted on said work table and defining a cutter receptacle spaced above the work table and over said opening, a cutter normally positioned in said receptacle in alignment with said arbor, said cutter and said cutter holder including means for releasably maintaining said cutter in said receptacle, and said arbor and said cutter including connector means for releasably connecting together said arbor and said cutter.

3. The spot facing tool of claim 1 or 2 wherein said cutter holder and said cutter further include means for limiting the rotation of said cutter in said receptacle to only one direction of rotation.

4. The spot facing tool of claim 1 or 2 wherein said means for releasably maintaining said cutter in said receptable comprises an annular groove defined in said cutter and a spring loaded ball element supported by said cutter holder biased into the annular groove.

5. The spot facing tool of claim 1 or 2 and wherein said connector means for releasably connecting together said arbor and said cutter comprises an internally threaded bore defined in said cutter and an externally threaded protrusion on the upper end of said arbor, whereby rotation of said cutter and arbor with respect to each other causes the threads of said cutter and arbor to engage or disengage each other.

6. A method of spot facing a work piece about a bore through the work piece comprising placing the work piece on a work table over an opening in the work table, maintaining a cutter over the opening in the work table, moving an end portion of an arbor upwardly through the opening in the work piece and through the bore of the work piece into engagement with the cutter, connecting the cutter to the end of the arbor, rotating the arbor and cutter and moving arbor and cutter downwardly until the cutter is in rotational engagement with the portion of the work piece surrounding the bore of the work piece.

* * * * *